United States Patent Office 2,955,846
Patented Oct. 11, 1960

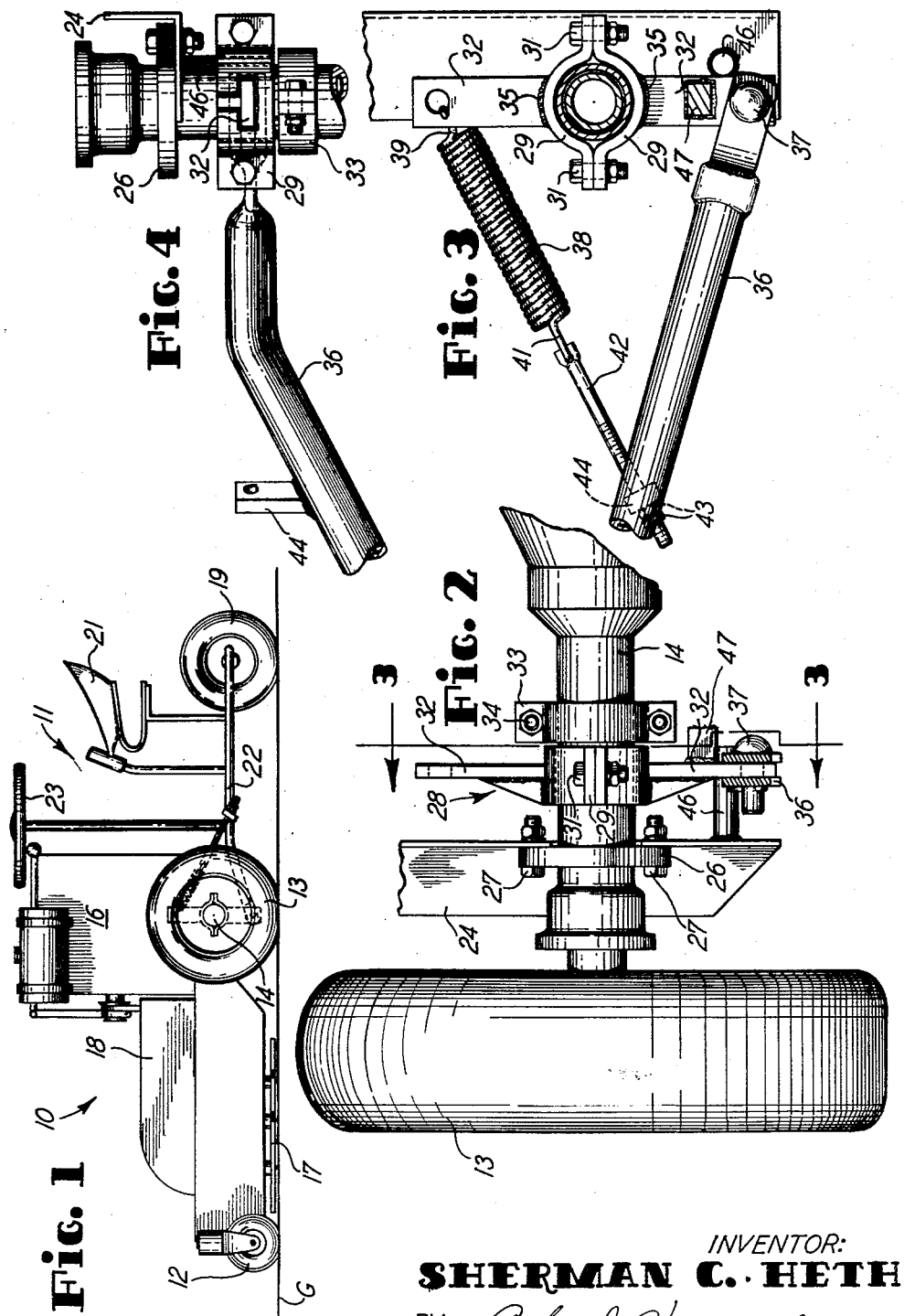

2,955,846

DRAFT CONNECTION BETWEEN TOWING AND TOWED DEVICES

Sherman C. Heth, Racine, Wis., assignor to Jacobsen Manufacturing Company, Racine, Wis., a corporation of Wisconsin Filed Oct. 2, 1959, Ser. No. 844,118

7 Claims. (Cl. 280—405)

This invention relates to a draft connection between a towing and a towed device, and more particularly it relates to a draft connection between a lawn mower or the like and a riding sulky.

It is an object of this invention to provide a draft connection between a towing device and a towed device wherein the connection provides traction force on the rear traction wheels of the towing device in proportion to the towing force between the two devices.

Another object of this invention is to accomplish the foregoing object of increasing traction, but to do so without inducing a force which will tend to tip the towing device upwardly at its front end. In appreciating this particular object, mention is herewith made of the application of the invention to a lawn mower and its riding sulky, which are attached by means of the draft connection of this invention and it should here be understood that a problem exists with regard to running the lawn mower and sulky up a hill. This particular problem is that in moving up a hill, it has been found that some draft connections actually cause a tipping force upwardly on the front end of the lawn mower, such that the lawn mower tends to tip backwards onto the operator sitting in the sulky which is trailing behind the mower. As mentioned, it is desired that the instant invention overcomes this problem.

Still another object of this invention is to provide a draft connection between a lawn mower and its trailing sulky and to do so in an inexpensive and simplified manner. At this time, mention is made of the fact that several inventions have been made with the end result of increasing traction on farm tractor drive wheels, where the tractor has a towed or trailing device draft connected thereto. However, in these instances, the known structures are different from that disclosed herein and further, the point which is to be emphasized at this time is the fact that the tractor structures are necessarily more complicated and expensive and simply do not lend themselves to the answer to the problem of providing a draft connection between a lawn mower and a riding sulky, which are considerably smaller and less expensive than the farm tractor. Also, in the present application of the draft connection, the draw bar extending forwardly at the riding sulky supports the weight of the sulky and the draw bar is thus in turn supported on the lawn mower, and this particular condition of supporting a weight is not generally found in the tractor art, as in most instances the towed device is self-supporting on its own ground-engaging members such as wheels, plow blades and the like.

Other objects and advantages of this invention will become apparent upon reading the following description in conjunction with the accompanying drawings wherein:

Fig. 1 is a side elevational and diagrammatic view of a lawn mower and its trailing sulky incorporating the draft connection of this invention.

Fig. 2 is an enlarged rear view of a portion of that shown in Fig. 1.

Fig. 3 is a sectional view taken along the line 3—3 of Fig. 2, with parts added.

Fig. 4 is a top plan view of that shown in Fig. 3, with parts removed.

The same reference numerals refer to the same parts throughout the several views.

The drawings show the draft connection of this invention to be applied between a lawn mower 10 and a riding sulky 11, which are respectively a towing device and a towed device. The mower 10 is generally shown to include ground-engaging front wheels 12 and rear traction wheels 13 mounted on rear axle 14. Also, it will be understood that an engine 16 is drivingly connected in any conventional manner to the axle 14 for the purpose of powering the traction wheels 13 to give the required forward motion to the unit. Also, a lawn cutter blade 17 is shown mounted on the housing 18 of the mower 10. Further, the sulky 11 is shown to have ground-engaging wheels 19 and a seat 21 is suitably mounted on the frame or draw bar 22 of the sulky 11. Of course, an operator can occupy the seat 21 and suitable steering wheel 23 is provided on the mower 10 so that the entire unit can be guided and steered by the operator on the seat 21. The foregoing simply refers to conventional arrangements of lawn mower and trailing riding sulky, and thus no further description is necessary for a complete disclosure of this invention of the draft connection between the mower 10 and the sulky 11.

Figs. 2, 3 and 4 clearly show the details of this connection, and they further orient the draft connection to the conventional parts of the mower mentioned in conjunction with Fig. 1. Thus, Fig. 2 shows the mower left traction wheel 13 and it shows the axle housing 14, and of course it will be understood that the driving axle extends through the housing 14 for driving the wheel 13 in the usual manner, so a conventional mower frame member 24 is shown mounted on the axle 14 by means of a plate 26 and bolts 27, which all suitably secure the frame member 24 to the housing 14. It will thus be understood that the member 24 is fixedly mounted on the mower 10 to remain in the position shown in Fig. 2, and that is simply an upright position and further, the member 24 is shown to be an angle iron piece.

As previously mentioned, this invention relates to the draft connection, generally designated 28 and which forms the connection between the mower 10 and the sulky 11. Thus, a pair of semicircular brackets 29 are pivotally or rotatably mounted on the axle housing 14 by means of bolts 31. The members 29 have arms or extensions 32 shown welded thereto at 36 so that the arms 32 present a member or arm pivotally mounted on the axle 14 for pivotal movement in the fore-and-aft plane of the mower 10. It will also be noticed that two other brackets 33 are bolted to the axle 14 by means of bolts 34 and these members 33 are fixed onto the axle 14 to thus present a stop or limit for the movement of the brackets 29 axially on the axle 14.

The sulky frame or draw bar 22 includes a forward end 36, which is pivotally attached by means of pin 37 to the lower end of the arm 32. Thus, with this connection, the weight of the sulky 11 and the operator thereon are dependent, or exerted downwardly on the axle 14 through the pivot arm 32, and this provides a desired traction force on the mower traction wheels 13.

A tension coil spring 38 is attached at an upper end 39 to the upper end of the pivot arm 32, while the lower end 41 of the coil spring 38 is attached to a threaded link 42, which in turn is secured by nuts 43 to a bracket 44 welded onto the draw bar end 36.

With the foregoing described draft connection, it will now be understood that the weight of the sulky and the operator thereon bear downwardly through the pin 37 on the arm 32 on the axle 14 to provide a traction force on the traction wheel 13. When the mower 10 and sulky 11 are being accelerated and also when they are going uphill, there is an increase in the draft or towing force between the mower 10 and sulky 11. Under these conditions, the arm 32 tends to, and actually does under certain forces, rotate clockwise, as viewed in Fig. 3. This rotation causes the spring 38 to become extended and thus the spring exerts an increased force between its mounting points on the bracket 44 and the upper end of the arm 32. It will further be understood that the force of the spring on the upper end of the arm 32 is, of course directed downwardly and along the axis of the spring 38 and this force, of course, results in a component force directed downwardly and onto the axle 14 to thereby increase the traction force on the traction wheels 13. It will also be understood that since the arm 32 is pivotally or rotatably mounted on the axle 14, there is no force created which will tend to tip the mower upwardly at its front wheel 12, and the only forces which can thus act on the axle 14 are either horizontal or vertical in the downward direction. It will be noticed that the draft bar end 36 is angularly disposed with respect to the horizontal center through the axle as shown in Fig. 3, such that the angle is substantially less with respect to the center line than is the angle which the spring 38 and the link 42 form with the center line through the axle 14. Thus, when the draft force exerted through the draw bar end 36 is increased, the downward force component exerted through the pin 37 is not proportionately increased since the draw bar 36 and lower end of link 32 become more aligned with each other, as the pin 37 is rotated upwardly. At the same time the force of the spring 38, as it is increased in length, is transferred through the upper end of the arm 32 more directly downwardly on the axle 14 to provide the increased traction force desired. Expressing it a somewhat different way, it should be noted that the bracket 44, which provides the connection point for the lower end of the spring 38 is below the center line through the axle 14.

A stop 46 is shown welded to the lower end of the angle 24 and it extends into the plane of the arm 32 in front of the lower end thereof. The arm 32 is thereby prevented from rotating counterclockwise beyond the position shown in Fig. 3, so any over-run of the sulky with respect to the mower is prevented. Also, Fig. 4 shows the draw bar 36 to be angled to one side with respect to the axle 14, and it will be understood that a similar construction is on the other end of the axle 14 connected to another bar 36 which is also connected to another rocker arm 32. Then a tie rod 47 is attached to the members 32 to extend therebetween so that they pivot in unison. Short turns or obstructions encountered by the front vehicle wheels will not actuate only one of the arms 32 to disturb the directional control of the vehicle.

While a specific embodiment of this invention has been shown and described, it should be obvious that certain changes could be made in the embodiment which should therefore be limited only by the scope of the appended claims.

What is claimed is:

1. A draft connection between a towing and a towed device, comprising an axle mounted on said towing device and extending transverse to the fore-and-aft axis thereof, an arm pivotally mounted on said axle of said towing device and extending above and below said axle, a draw bar on said towed device and being pivotally attached to said arm at a point thereon below the pivot axis of said arm, and extensible and resilient force transmitting means being connected at one end to said arm at a point thereon above the pivot axis of said arm and at the other end to said draw bar and adapted to increase the force between the latter said ends upon extension of said means for exerting a downward force on said rear of said towing device through said arm in response to increased force on said draw bar.

2. A draft connection between a towing and a towed device, comprising an axle disposed on said towing device transverse to the fore-and-aft axis thereof, an arm pivotally mounted on said axle of said towing device for pivoting about the axis of said axle, a draw bar on said towed device and being pivotally attached to said arm at a point thereon below the pivot axis of said arm, and a tension coil spring attached at one end to said arm at a point thereon above the pivot axis of said arm and at the other end to said draw bar for exerting a downward force on said rear of said towing device through said arm.

3. A draft connection between a towing and a towed device with said towing device including a rear axle with traction wheels, comprising an arm pivotally mounted on said towing device at least immediately adjacent said rear axle of said towing device for rocking movement in the fore-and-aft plane of said towing device and extending in both an upper end above said axle and a lower end below said axle, a draw bar on said towed device and being pivotally attached to said lower end of said arm to depend thereon, and an extensible force transmitting means attached at one end to said upper end of said arm and at the other end to said draw bar and adapted to increase the force transmitted thereby when extended for exerting a downward force on said rear axle of said towing device through said arm and in response to the towing force transmitted between said arm and said draw bar.

4. A draft connection between a towing and a towed device wherein said towing device includes a rear axle and traction rear wheels thereon, comprising an arm pivotally mounted on said rear axle of said towing device and extending above and below said rear axle, a draw bar on said towed device and being pivotally attached to said arm at a point thereon below the pivot axis of said arm and with the weight of said towed device being supported on said arm, and a tension coil spring attached at one end to said arm at a point thereon above the pivot axis of said arm and at the other end to said draw bar for exerting a downward force on said rear axle of said towing device through said arm when said arm is pivoted by a towing force transmitted through said draw bar to thereby increase downward traction force on said rear wheels.

5. A draft connection between a lawn mower or the like and a riding sulky wherein the mower includes a rear axle with traction wheels thereon, comprising an arm pivotally mounted on said rear axle for pivotal movement in the fore-and-aft plane of said mower or the like, said arm including an upper end extending above said axle and a lower end extending below said axle, a draw bar on said sulky pivotally attached to said lower end of said arm for exerting a downward force on said axle due to the weight of said sulky, and a tension coil spring attached at one end to said upper end of said arm and attached at the other end to said draw bar at a point below the level of said one end to exert a downward force on said axle through said arm when the latter is pivoted in one direction in response to a draft force exerted by said draw bar on said arm.

6. A draft connection between a lawn mower or the like and a riding sulky wherein the mower includes a rear axle with traction wheels thereon, comprising an arm pivotally mounted on said rear axle for pivotal movement in the fore-and-aft plane of said mower or the like, said arm including an upper end extending above said axle and a lower end extending below said axle, a draw bar on said sulky pivotally attached to said lower end of said arm for exerting a downward force on said axle due to the weight of said sulky, a tension coil spring attached at one end to said upper end of said arm and attached at the other end to said draw bar at a point below the level of said one end to exert a downward force on said axle through said arm when the latter is pivoted in one direction in response to a draft force exerted by said draw bar on said arm, and a stop mounted on said mower or the like for engaging said arm to limit pivotal movement thereof in the direction opposite to said one direction and thereby limit the forward motion of said draw bar with respect to said axle.

7. A draft connection between a lawn mower or the like and a riding sulky wherein the mower includes a rear axle with traction wheels thereon, comprising an arm pivotally mounted on said rear axle for pivotal movement in the fore-and-aft plane of said mower or the like, said arm including an upper end extending above said axle and a lower end extending below said axle, a draw bar on said sulky pivotally attached to said lower end of said arm for exerting a downward force on said axle due to the weight of said sulky, said draw bar including a portion extending rearwardly from said arm and disposed below the level of said axle, and a tension coil spring attached at one end to said upper end of said arm and attached at the other end to a portion of said draw bar to exert a downward force on said axle through said arm when the latter is pivoted in one direction in response to a draft force exerted by said draw bar on said arm.

References Cited in the file of this patent

UNITED STATES PATENTS

| | | |
|---|---|---|
| 2,540,677 | Kandt et al. | Feb. 6, 1951 |
| 2,551,870 | Bridger | May 8, 1951 |
| 2,872,214 | Hume | Feb. 3, 1959 |